US009593282B2

(12) United States Patent
Marker et al.

(10) Patent No.: US 9,593,282 B2
(45) Date of Patent: Mar. 14, 2017

(54) REMOVAL OF HYDROGEN SULFIDE AS AMMONIUM SULFATE FROM HYDROPYROLYSIS PRODUCT VAPORS

(71) Applicant: Gas Technology Institute, Des Plaines, IL (US)

(72) Inventors: Terry L. Marker, Palos Heights, IL (US); Larry G. Felix, Pelham, AL (US); Martin B. Linck, Grayslake, IL (US); Michael J. Roberts, Itasca, IL (US)

(73) Assignee: Gas Technology Institute, Des Plaines, IL (US)

( * ) Notice: Subject to any disclaimer, the term of this patent is extended or adjusted under 35 U.S.C. 154(b) by 277 days.

(21) Appl. No.: 14/512,841

(22) Filed: Oct. 13, 2014

(65) Prior Publication Data

US 2015/0027184 A1    Jan. 29, 2015

Related U.S. Application Data

(63) Continuation of application No. 13/196,645, filed on Aug. 2, 2011, now Pat. No. 8,859,831.

(51) Int. Cl.
  *C07C 1/00*  (2006.01)
  *C10G 1/00*  (2006.01)
  (Continued)

(52) U.S. Cl.
  CPC ............ *C10G 1/002* (2013.01); *B01D 53/52* (2013.01); *B01D 53/75* (2013.01); *C01B 3/38* (2013.01);
  (Continued)

(58) Field of Classification Search
  CPC .. C10G 2400/02; C10G 2300/101; C10L 1/04
  (Continued)

(56) References Cited

U.S. PATENT DOCUMENTS 4,061,481 A    12/1977    Campbell et al.
4,336,125 A    6/1982    Weil et al.
(Continued)

FOREIGN PATENT DOCUMENTS

CN    87104309 A    3/1988
EP    0623554 A1    11/1994
(Continued)

OTHER PUBLICATIONS

Dec. 31, 2014 (CN) Search Report—App 201280048542.5—Eng Tran.
(Continued)

*Primary Examiner* — Nina Bhat
(74) *Attorney, Agent, or Firm* — Banner & Witcoff, Ltd.

(57) ABSTRACT

A system and method for processing biomass into hydrocarbon fuels that includes processing a biomass in a hydropyrolysis reactor resulting in hydrocarbon fuels and a process vapor stream and cooling the process vapor stream to a condensation temperature resulting in an aqueous stream. The aqueous stream is sent to a catalytic reactor where it is oxidized to obtain a product stream containing ammonia and ammonium sulfate. A resulting cooled product vapor stream includes non-condensable process vapors comprising $H_2$, $CH_4$, CO, $CO_2$, ammonia and hydrogen sulfide.

25 Claims, 6 Drawing Sheets

(51) Int. Cl.
| | |
|---|---|
| *B01D 53/52* | (2006.01) |
| *C01C 1/247* | (2006.01) |
| *C10K 1/00* | (2006.01) |
| *C10L 1/04* | (2006.01) |
| *C10G 1/06* | (2006.01) |
| *C10G 3/00* | (2006.01) |
| *B01D 53/75* | (2006.01) |
| *C01C 1/02* | (2006.01) |
| *C01B 3/38* | (2006.01) |
| *C05C 3/00* | (2006.01) |

(52) U.S. Cl.
CPC ............. *C01C 1/022* (2013.01); *C01C 1/026* (2013.01); *C01C 1/247* (2013.01); *C05C 3/00* (2013.01); *C10G 1/06* (2013.01); *C10G 3/50* (2013.01); *C10K 1/004* (2013.01); *C10L 1/04* (2013.01); *B01D 2255/705* (2013.01); *B01D 2257/304* (2013.01); *C01B 2203/0233* (2013.01); *C10G 2300/1011* (2013.01); *C10G 2300/207* (2013.01); *C10G 2400/02* (2013.01); *C10G 2400/04* (2013.01); *C10G 2400/08* (2013.01); *C10J 2300/0966* (2013.01); *C10L 2200/0469* (2013.01); *Y02E 50/32* (2013.01); *Y02P 20/52* (2015.11); *Y02P 30/20* (2015.11)

(58) Field of Classification Search
USPC .................................. 585/240, 242
See application file for complete search history.

(56) References Cited

U.S. PATENT DOCUMENTS

| | | |
|---|---|---|
| 4,415,431 A | 11/1983 | Matyas et al. |
| 4,690,807 A | 9/1987 | Saleem |
| 4,749,555 A | 6/1988 | Bush |
| 4,765,873 A | 8/1988 | Chang et al. |
| 4,854,249 A | 8/1989 | Khinkis et al. |
| 4,908,122 A | 3/1990 | Frame et al. |
| 4,913,802 A | 4/1990 | Bricker et al. |
| 5,207,927 A | 5/1993 | Marinangeli et al. |
| 5,427,762 A | 6/1995 | Steinberg et al. |
| 5,470,486 A | 11/1995 | Gillespie |
| 5,536,385 A | 7/1996 | Sheldon et al. |
| 6,017,501 A | 1/2000 | Waycuilis |
| 7,258,848 B1 | 8/2007 | Blackwell et al. |
| 8,217,210 B2 | 7/2012 | Agrawal et al. |
| 8,268,026 B2 | 9/2012 | Norbeck et al. |
| 8,353,980 B2 | 1/2013 | Murphy |
| 8,383,871 B1 | 2/2013 | Sellars et al. |
| 8,492,600 B2 | 7/2013 | Marker et al. |
| 8,859,831 B2 * | 10/2014 | Marker .................. B01D 53/52 |
| | | 201/2.5 |
| 2008/0312346 A1 | 12/2008 | McCall et al. |
| 2009/0082604 A1 | 3/2009 | Agrawal et al. |
| 2009/0084666 A1 | 4/2009 | Agrawal et al. |
| 2010/0251615 A1 | 10/2010 | Marker et al. |
| 2011/0009988 A1 | 1/2011 | Kitahara et al. |
| 2011/0099888 A1 | 5/2011 | Bartek et al. |

FOREIGN PATENT DOCUMENTS

| | | |
|---|---|---|
| UA | 66912 C2 | 6/2004 |
| WO | 0053290 A1 | 9/2000 |
| WO | 2011053166 | 5/2011 |

OTHER PUBLICATIONS

Feb. 4, 2014 (WO) International Preliminary Report on Patentability—App. PCT/US2012/048345.
Nov. 5, 2012 (WO) Interntional Search Report and Written Opinion—App. PCT/US2012/048345.
Apr. 12, 2016 (UA) Decision to Grant—App. 2014-01083.
Jun. 6, 2016 (RU) Office Action—App. 2014107841.
Jan. 12, 2015 (CN) First Office Action—App. 201280048542.5.
May 18, 2016 (AU) Patent Examination Report No. 1—App. 2012290464.
Mar. 7, 2016 (NZ) First Examination Report—App. 716910.
Jun. 15m 2016 (CL) Examination Report—App. 261-2014.

* cited by examiner

REMOVAL OF HYDROGEN SULFIDE AS AMMONIUM SULFATE FROM HYDROPYROLYSIS PRODUCT VAPORS

CROSS-REFERENCE TO RELATED APPLICATIONS

This application is a continuation of U.S. Application No. 13/196,645, filed Aug. 2, 2011, now allowed U.S. Pat. No. 8,859,831, which is hereby incorporated by reference in its entirety.

GOVERNMENT LICENSE RIGHTS

This invention was made with government support under Contract No. DE-EE0002873awarded by the U.S. Department of Energy. The government has certain rights in the invention.

FIELD OF THE INVENTION

This invention relates to a process that removes hydrogen sulfide ($H_2S$) from product vapors exiting a Hydropyrolysis reactor via reaction with ammonia ($NH_3$) to form ammonium sulfide. In addition, the process converts hydrogen sulfide to ammonium sulfate.

DESCRIPTION OF RELATED ART

The process of the present invention relates to removal of $H_2S$ from the effluent vapors exiting a hydropyrolysis reactor. Hydropyrolysis reactors are known in the art.

Commercially, $H_2S$ is commonly removed from vapor streams via the Claus process, in a Claus plant. In the Claus Process, $H_2S$ is oxidized to form sulfur dioxide ($SO_2$) and then the sulfur dioxide is reacted with more $H_2S$ to produce water ($H_2O$) and elemental sulfur. The overall reaction is:

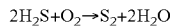

$$2H_2S + O_2 \rightarrow S_2 + 2H_2O$$

This process is well-known, and has been widely applied in the refining and reforming of petroleum products. However, the process is complex, and often involves multiple reaction steps. Moreover, the process can be most efficiently applied to streams containing 25% or more of $H_2S$, on a molecular basis. If streams containing ammonia, as well as $H_2S$ are processed in a Claus plant, the ammonia is oxidized along with the $H_2S$. This is not desirable, because ammonia is a potentially-valuable reaction product of the hydropyrolysis process.

A significant portion of the product vapor stream from the hydropyrolysis reactor comprises water vapor and hydrocarbons with boiling points below 70 degrees Fahrenheit, at atmospheric pressure. The product vapor from the hydropyrolysis reactor must be cooled to ambient temperatures in order for liquid hydrocarbons to be recovered as a separate product stream. When the product vapor stream is cooled, water vapor in the product vapor stream condenses to form liquid water, and a significant fraction of any $H_2S$ and any $NH_3$ in the product vapor stream go into solution in the liquid water. The resulting aqueous solution then contains ammonia and sulfide compounds.

Processes by which water-soluble sulfide compounds can be catalytically reacted with oxygen to form stable sulfate compounds are disclosed in Marinangeli et al., U.S. Pat. No. 5,207,927 Gillespie, U.S. Pat. No. 5,470,486. The approach taught by Marinangeli et al., involves passing an aqueous stream containing both the sulfide compound and oxygen over an appropriate oxidizing catalyst, under conditions wherein the pH of the solution is 9-12, and an oxygen-to-sulfur ratio greater than about 5 is maintained. The approach taught by Gillespie requires a pH greater than 12 and an oxygen-to-sulfur ratio greater than about 4 be maintained. Both approaches prefer metal phthalocynanines with Gillespie preferring the use of carbon supports. A product stream that is substantially free of sulfide compounds is thus obtained, since all sulfide compounds have been converted to sulfate compounds.

SUMMARY OF THE INVENTION

In the hydropyrolysis reactor of the process of the present invention, a biomass feedstock is converted into a stream containing the following:

1. Deoxygenated condensable hydrocarbons (with properties corresponding to those of gasoline, diesel and kerosene)
2. Non-condensable hydrocarbon vapors (such as methane, ethane, propane and butane),
3. Other non-condensable vapors ($CO_2$, CO, and hydrogen),
4. Water and species which are soluble in liquid water, such as ammonia ($NH_3$), and hydrogen sulfide ($H_2S$).

The $NH_3$ is present in the hydropyrolysis product stream due to the presence of nitrogen in the biomass feedstock. The $H_2S$ is present in the hydropyrolysis stream due to the presence of sulfur in the biomass feedstock. The nitrogen and the sulfur in the feedstock react with hydrogen in the hydropyrolysis reactor to form $NH_3$ and $H_2S$, respectively.

It is one object of this invention to provide a method by which hydrogen sulfide can be removed from a product vapor stream, produced by the hydropyrolysis of biomass. Hydropyrolysis experiments, in the course of which biomass was deoxygenated and converted to products including hydrocarbons, have shown that the stream of vapor leaving the hydropyrolizer contains water vapor, $NH_3$, and $H_2S$, in proportions that make this product uniquely suited to a process in which the $H_2S$ is combined with the $NH_3$ in an aqueous solution, and then oxidized to form ammonium sulfate. These experiments are original, and the concentrations of nitrogen and sulfur compounds in the vapor stream are unexpected and surprising. The experiments are described in detail in the examples presented below.

In order to carry out hydropyrolysis in the hydropyrolysis reactor associated with the present invention, some portion of the hydropyrolysis product stream from the reactor may be sent to a steam reformer, and there reacted with steam to produce hydrogen. Generally, it will be desirable to send some or all of the non-condensable hydrocarbon vapors, such as methane, ethane, butane, etc., to the reformer. The hydrogen thus obtained may then be introduced back into the hydropyrolysis reactor, so that hydropyrolysis can continue to be carried out. The need for a source of hydrogen, external to the hydropyrolysis process associated with the present invention, may thus be reduced or eliminated. Note that $H_2S$ will be present in the product vapor stream from the hydropyrolysis process whenever sulfur is present in the feedstock, and the presence of the $H_2S$ creates several problems.

The $H_2S$ in the product vapor stream is highly toxic to humans. In addition, the $H_2S$ can poison the catalysts involved in steam reforming of product vapors from the hydropyrolysis reactor. Moreover, the $H_2S$ can be reacted with $NH_3$ to produce ammonium sulfide (($NH_4)_2S$), and then oxidized to produce ammonium sulfate ($(NH_4)_2SO_4$), a product with considerable commercial value as a fertilizer.

The present invention describes a process which allows the $H_2S$ and $NH_3$ contained in product vapor from hydropyrolysis of biomass to be captured in an aqueous stream. Biomass hydropyrolysis experiments have demonstrated that the hydropyrolysis process associated with the present invention produces a product stream that contains water vapor, $H_2S$, and $NH_3$ in particular quantities that make it possible to obtain the requisite conditions for $H_2S$ removal via conversion to $(NH_4)_2SO_4$. Substantially all the $H_2S$ captured in the aqueous stream is reacted with $NH_3$ to form $(NH_4)_2S$. In addition, a surplus of unreacted $NH_3$ is provided and dissolved in the aqueous stream, in order to increase the pH of the aqueous stream to approximately 12 or greater or lesser as required for subsequent conversion of $(NH_4)_2S$ to $(NH_4)_2SO_4$. The stream can then be reacted with oxygen in a thermal, non-catalytic conversion zone to substantially convert the dissolved $(NH_4)_2S$ to $(NH_4)_2SO_4$ and thiosulfate. The stream can be further contacted with oxygen and an oxidizing catalyst in accordance with the method disclosed in Gillespie, U.S. Pat. No. 5,470,486 or, alternatively, the incoming aqueous stream can be reacted with oxygen, in the presence of an appropriate catalyst, in accordance with the method disclosed in the U.S. Pat. No. 5,207,927 (Marinangeli, et al.). By employing either technology, within the ranges of pH, oxygen to sulfur mole ratio, pressure, temperature, and liquid hourly space velocities taught in these patents, an aqueous stream containing $NH_3$ and $(NH_4)_2SO_4$ is thereby obtained, and these compounds can then be recovered and sold as fertilizer. A variety of methods for obtaining ammonium sulfate from an aqueous stream containing ammonium sulfite and dissolved ammonia are currently in use and the examples cited above serve to illustrate that established technologies exist for effecting this conversion.

These ammonia-derived compounds that can be recovered and sold as fertilizer can be mixed with char produced by this process and pelletized to produce a product to provide fertilize and amend soils. Likewise these ammonia-derived compounds produced by this process that can be recovered and sold as fertilizer can also be mixed with char and other essential soil nutrients and minerals and pelletized to produce a product to provide improve, fertilize, and amend soils. It should also be obvious to one skilled in the art that these ammonia-derived compounds that incorporate char and other essential soil nutrients and minerals can be prepared in time-release formulations to avoid repetitive applications in an agricultural setting.

A stream of product vapor, from which substantially all the $H_2S$ has been removed, is also obtained. This stream of vapor can then be handled in various ways, including use as a fuel to raise steam or directing it into a steam reformer.

BRIEF DESCRIPTION OF THE DRAWINGS

These and other objects and features of this invention will be better understood from the following detailed description taken in conjunction with the drawings wherein.

DETAILED DESCRIPTION OF THE PRESENTLY PREFERRED EMBODIMENTS

Figure 1:
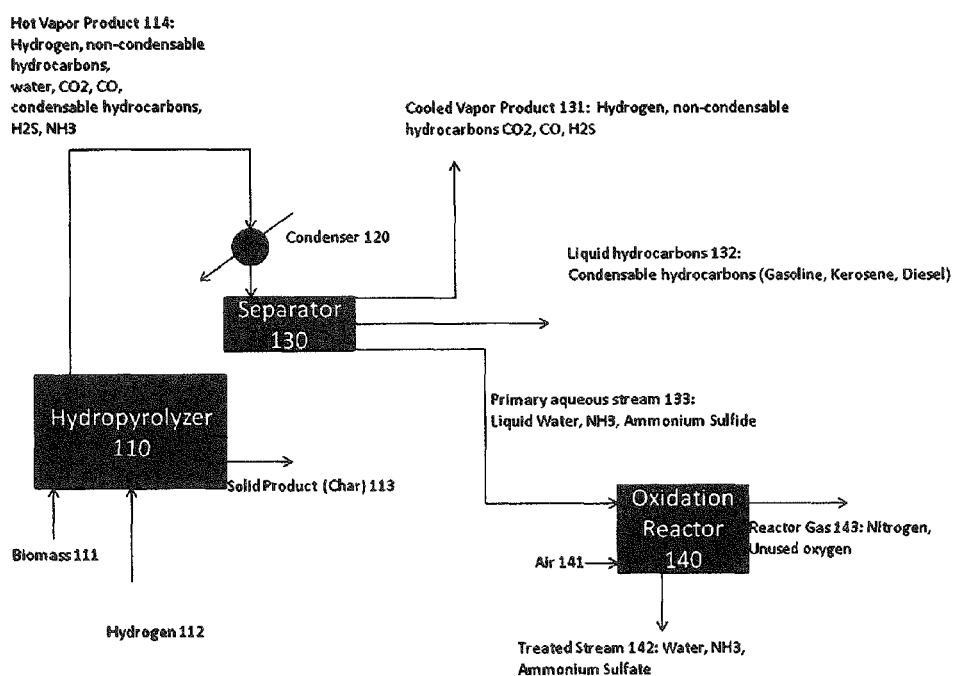
FIG. 1 shows a process flow diagram according to one preferred embodiment of this invention, in which $H_2S$ is captured in a primary aqueous stream containing $NH_3$, and oxidized in a reactor to form $(NH_4)_2SO_4$.

FIGS. 1-6 show various preferred embodiments of the subject invention. FIG. 1 shows a process flow diagram, illustrating the simplest embodiment of the process of the present invention, in which $H_2S$ is captured in a primary aqueous stream containing $NH_3$, and oxidized in a reactor to form $(NH_4)_2SO_4$. Product streams in this embodiment include a cooled vapor stream comprising primarily process vapors, and containing some $H_2S$, a liquid stream comprising primarily condensed hydrocarbons, a second vapor stream comprising primarily nitrogen and oxygen, and a treated aqueous stream comprising primarily water, $NH_3$, and $(NH_4)_2SO_4$.

FIG. 1 shows the first and most elementary embodiment of the process of the present invention. Biomass 111 and hydrogen 112 are introduced into a hydropyrolizer 110, which produces a solid, carbonaceous product 113 (referred to as char) and a product vapor stream 114. The solid product 113 comprises primarily carbonaceous residue, remaining after the hydropyrolysis of the biomass feedstock 111. The product vapor stream 114 leaves the hydropyrolizer 110 (which may comprise a single reactor, or multiple reactors in series) at a temperature that is characteristic of such hydropyrolytic processes, at a minimum, high enough that all constituents are maintained in a gaseous state. However, as is characteristic of such hydropyrolytic conversion processes, the temperature may also be significantly higher than this minimum. The product vapor stream 114 primarily comprises:

1. Deoxygenated condensable hydrocarbons (with properties corresponding to those of gasoline, diesel and kerosene)
2. Non-condensable hydrocarbon vapors (such as methane, ethane, propane and butane),
3. Other non-condensable vapors ($CO_2$, CO, and $H_2$),
4. Water and species which are soluble in liquid water, such as ammonia ($NH_3$), and hydrogen sulfide ($H_2S$).

The vapor stream is passed through a condenser 120, or other device, or other set of devices, wherein the temperature of the vapor stream is reduced to a point where substantially all the condensable hydrocarbons can be recovered as a liquid stream. At this point, three phases develop: A cooled vapor phase, a hydrocarbon phase, and an aqueous phase. The cooled product stream, containing all three phases, is sent to a separator 130, where the three phases can be split up into three separate streams.

The condensable hydrocarbon product stream 132 is preferably recovered at this point. The $H_2S$ that was initially in the hot product vapor stream 114 is now divided, with some exiting the separator in the cooled vapor stream 131, and some in the primary aqueous stream 133. A trace of $H_2S$ may also be present in the liquid hydrocarbon stream 132, but the solubility of the polar $H_2S$ molecule in the liquid hydrocarbon stream is minimal.

The cooled vapor product stream 131 leaving the separator comprises primarily $H_2$, non-condensable hydrocarbons, $CO_2$, CO, and $H_2S$.

The primary aqueous stream 133 leaving the separator comprises primarily water, $NH_3$, and ammonium sulfide $((NH_4)_2S)$. The $(NH_4)_2S$ in this stream is produced when the $H_2S$ from the vapor stream enters the aqueous stream and reacts with $NH_3$, which is also in solution in the aqueous stream. It is an object of this invention to control the process of the invention in such a manner that the pH of the primary aqueous stream 133 is approximately 12, meaning that the concentration of $NH_3$ (as $NH_4OH$) in the stream is great enough to produce a strongly-basic solution. This is helpful, in part, to help stabilize the $H_2S$ and increase its solubility in the aqueous stream. It is also a preferred condition for the operation of the oxidation reactor 140, wherein the $(NH_4)_2S$ is oxidized to produce $(NH_4)_2SO_4$.

The primary aqueous stream 133 from the separator 130 is then introduced to an oxidation reactor 140, also referred to as a catalytic reactor herein. A stream of air 141 is also introduced to the oxidation reactor, in an amount sufficient to supply approximately 5 moles of oxygen for each mole of sulfur. After reaction at an appropriate temperature and pressure, in the presence of an appropriate catalyst, and for a sufficient residence time, the $(NH_4)_2S$ in the primary aqueous stream 133 is substantially completely oxidized.

In accordance with this first embodiment of the process of the present invention, a treated aqueous product stream 142 is preferably obtained from the oxidation reactor, including $NH_3$, liquid water, and $(NH_4)_2SO_4$. In addition, a reactor gas product stream 143 is obtained from the oxidation reactor, primarily comprising nitrogen and unused oxygen, and containing traces of $NH_3$ and water vapor. It will be noted that, in this first embodiment, a significant concentration of $H_2S$ is still present in the cooled product vapor stream 131 exiting the separator unit 130.

Figure 2:
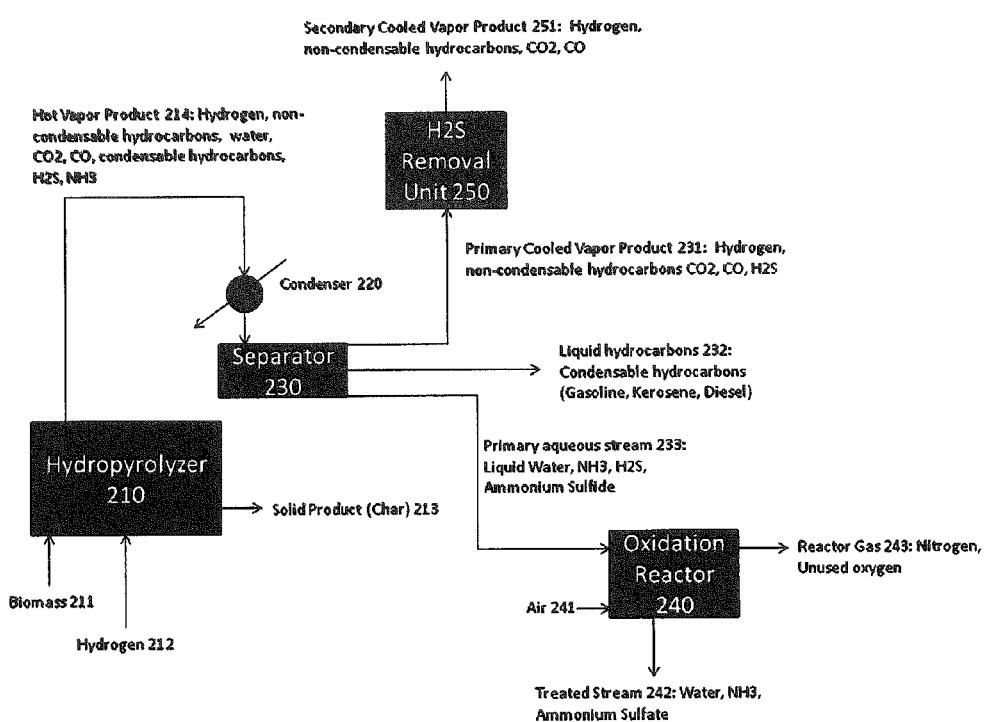
FIG. 2 shows a process flow diagram according to one preferred embodiment of this invention, in which $H_2S$ that still remains in the cooled vapor product stream is captured in a sorbent bed.

FIG. 2 is a process flow diagram, illustrating an embodiment of the process of the present invention, in which $H_2S$ that still remains in the cooled vapor product stream is captured in a sorbent bed. In this case, removal of the $H_2S$ remaining in the cooled product vapor stream is substantially complete.

FIG. 2 illustrates a second embodiment of the process of the present invention. In this second embodiment an $H_2S$ removal unit 250 has been added, downstream of the separator 230. The primary cooled vapor product stream 231 passes through the $H_2S$ removal unit 250 (which may comprise a sorbent bed, liquid wash, or other similar apparatus). The $H_2S$ in the primary cooled vapor product stream 231 is substantially completely removed from the primary cooled vapor product stream 231, and a secondary cooled vapor product stream 251 comprising primarily $H_2$, CO, $CO_2$, and non-condensable hydrocarbon vapors is obtained. In this embodiment, the $H_2S$ is not recovered, and would, for example, be disposed of when the $H_2S$ removal unit 250 is regenerated with $H_2S$-containing waste being appropriately discarded.

Figure 3:
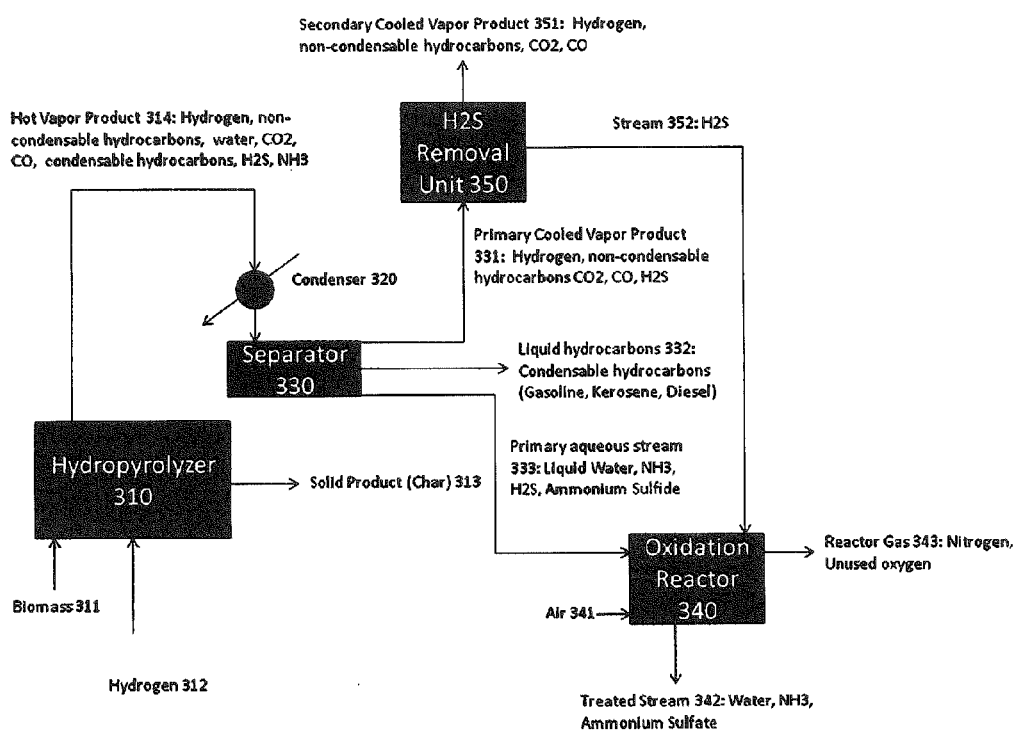
FIG. 3 shows a process flow diagram according to one preferred embodiment of this invention, in which the $H_2S$ remaining in the cooled vapor product stream is captured and sent into the oxidation reactor along with the primary aqueous stream, promoting more complete overall conversion of $H_2S$ to $(NH_4)_2SO_4$.

FIG. 3 illustrates a third embodiment of the process of the present invention. In this third embodiment, an $H_2S$ removal unit 350 has been added, downstream of the separator 330, as in the second embodiment, described above. The primary cooled vapor product stream 331 passes through the $H_2S$ removal unit 350 (which may comprise a reusable sorbent bed, amine scrubber, or some similar apparatus). The $H_2S$ in the primary cooled vapor product stream 331 is substantially completely removed, and a secondary cooled vapor product stream 351 comprising primarily $H_2$, CO, $CO_2$, and non-condensable hydrocarbon vapors is obtained. However, in this third embodiment, the $H_2S$ is recovered from the $H_2S$ removal unit 350, in a stream 352 comprising primarily gaseous $H_2S$, and is sent to the oxidation reactor 340, along with the primary aqueous stream 333. In the oxidation reactor, the gaseous $H_2S$ stream 352 is brought into contact with the primary aqueous stream 333 and an appropriate catalyst, and forms $(NH_4)_2S$, which is then oxidized to form $(NH_4)_2SO_4$. In this way, a secondary cooled product vapor stream 351, containing only trace amounts of $H_2S$, and comprising primarily $H_2$, non-condensable hydrocarbons, $CO_2$, and CO, is obtained. In addition, the overall conversion of $H_2S$ is increased, and is higher than in the first embodiment of the process of the present invention, described above.

Figure 4:
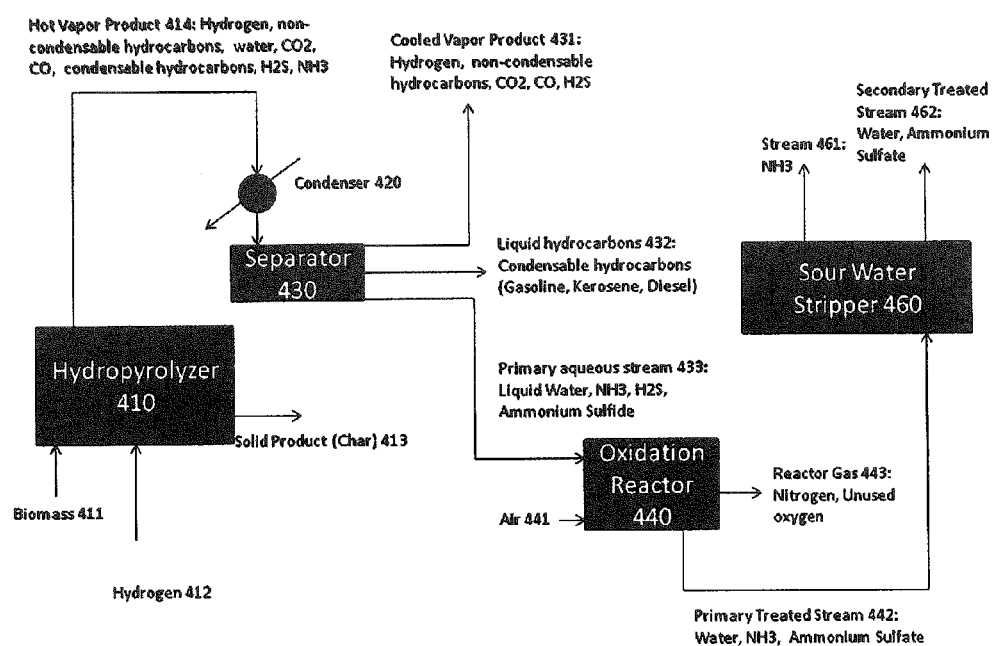
FIG. 4 shows a process flow diagram according to one preferred embodiment of this invention, in which the treated aqueous product stream, containing water, $NH_3$, and $(NH_4)_2SO_4$, is treated in a sour-gas stripper.

FIG. 4 illustrates a fourth embodiment of the process of the present invention. Ammonia ($NH_3$) is a potentially-valuable product, and is separated from the primary treated aqueous stream 442 leaving the oxidation reactor 440 in a sour-water stripper 460 in this fourth embodiment of the process of the present invention. This approach allows a gaseous stream 461 comprising primarily $NH_3$ to be recovered, while the water and $(NH_4)_2SO_4$ are recovered separately from the sour-water stripper in a secondary treated aqueous stream 462. $(NH_4)_2SO_4$ is highly water-soluble, and the aqueous solution of $(NH_4)_2SO_4$ has potential value as an agricultural fertilizer. If desired, this solution can be concentrated by further heating of the secondary treated aqueous stream 462, which could drive off some or all of the water in, the stream.

Figure 5:
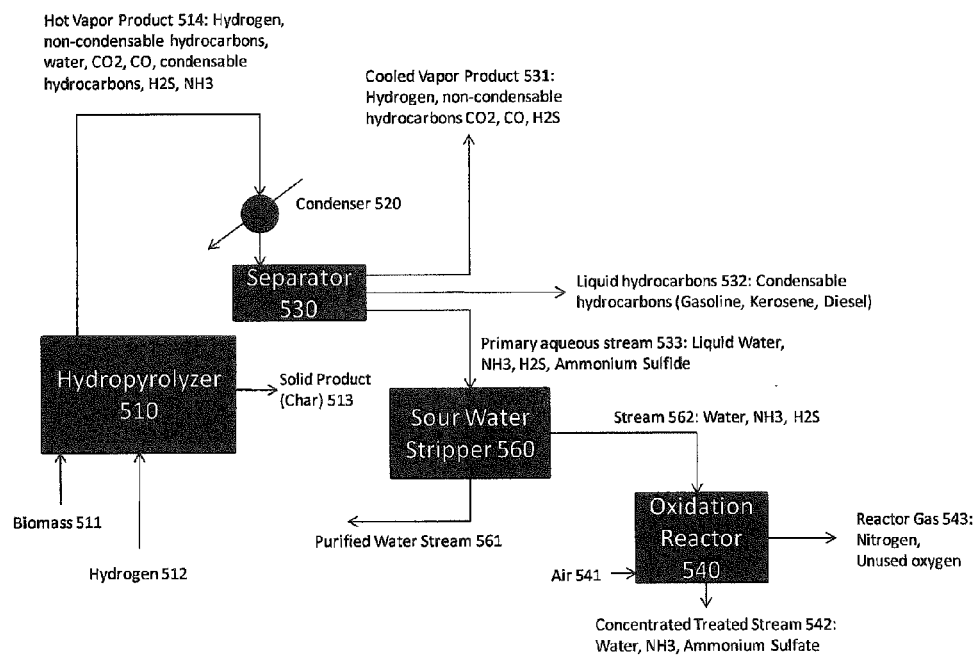
FIG. 5 shows a process flow diagram according to one preferred embodiment of this invention, in which a sour-water stripper removes $NH_3$ and $H_2S$ from the primary aqueous stream prior to the introduction of the aqueous stream to the oxidation reactor.

FIG. 5 illustrates a fifth embodiment of the process of the present invention. This embodiment features a sour-water stripper 560 upstream of the oxidation reactor 540, which accepts the primary aqueous stream 533 from the separator. Water, $NH_3$ and $H_2S$, and any $(NH_4)_2S$ formed by the reaction of $NH_3$ and $H_2S$, are removed in the sour-water stripper 560, and leave the sour-water stripper as a gaseous stream 562. A stream of purified liquid water 561 is thereby produced. This purified water stream 561 is then available as a product stream. If desired, a portion of this purified water stream 561 can be brought back into contact with the gaseous stream 562 of $NH_3$ and $H_2S$ from the sour-water stripper. In this case, the $NH_3$ and $H_2S$ go back into solution in this portion of the liquid water stream 561, forming $(NH_4)_2S$, and this solution is then introduced into the oxidation reactor 540, for conversion to $(NH_4)_2SO_4$. However, preferably the purified water stream is not brought back into contact with the gaseous stream 562 and preferably, stream 562 is cooled as needed so that water in the stream is condensed and the $NH_3$ and $H_2S$ in this stream go back into solution forming $(NH_4)_2S$, and this solution is then introduced into the oxidation reactor 540, for conversion to $(NH_4)_2SO_4$. This approach makes a stream of purified water 561 available, and creates a concentrated treated stream 542 of water, $NH_3$ and $(NH_4)_2SO_4$ at the outlet of the oxidation reactor 540.

Figure 6:
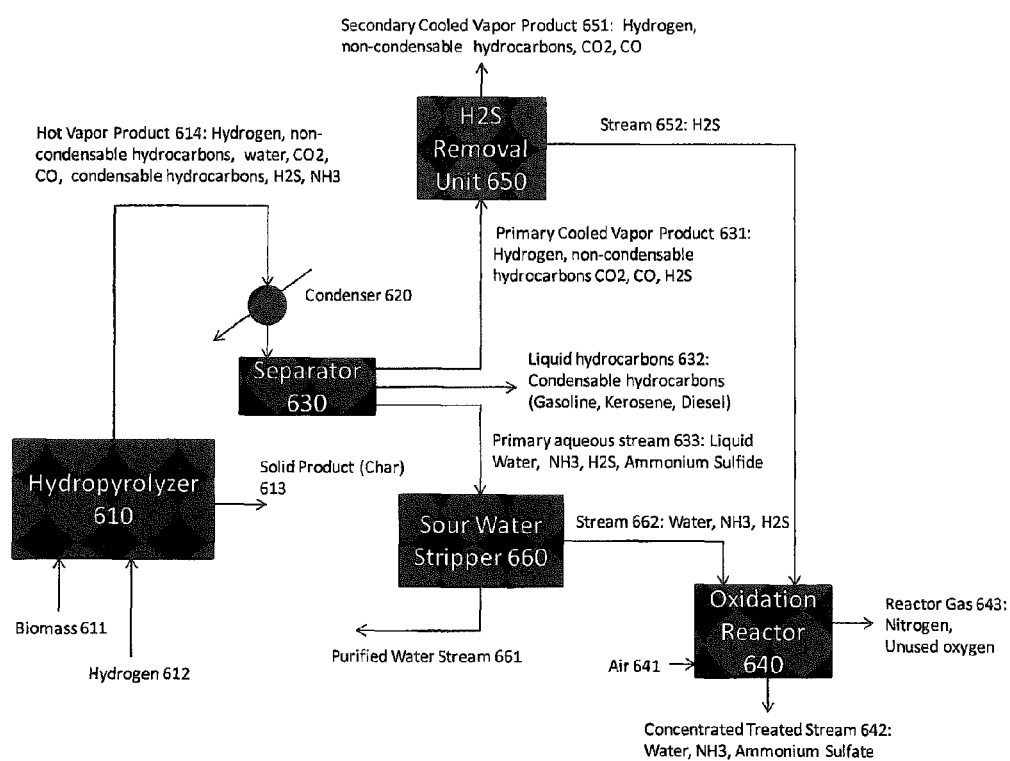
FIG. 6 shows a process flow diagram according to one preferred embodiment of this invention, which incorporates both an $H_2S$ removal unit, associated with the cooled vapor product stream, and a sour-water stripper upstream of the oxidation reactor.

FIG. 6 illustrates a sixth embodiment of the process of the present invention. This embodiment features a sour-water stripper 660 upstream of the oxidation reactor 640, which accepts the primary aqueous stream 633 from the separator 630. It also features an $H_2S$ removal unit 650 downstream of the separator 630, as in the third embodiment described herein above. The primary cooled vapor product stream 631 passes through the $H_2S$ removal unit 650 (which may comprise a sorbent bed, amine scrubber, or some similar apparatus). The $H_2S$ in the primary cooled vapor product stream 631 is substantially completely removed and a secondary cooled product vapor stream 651 comprising primarily $H_2$, CO, $CO_2$, and non-condensable hydrocarbon vapors is obtained. As in the third embodiment, the $H_2S$ is recovered, in a stream 652 comprising primarily gaseous $H_2S$, and is sent to the oxidation reactor 640.

As described herein above in the description of the fifth embodiment, dissolved $NH_3$ and $H_2S$, and any $(NH_4)_2S$ formed by the reaction of $NH_3$ and $H_2S$, are driven out of the primary aqueous stream 633 in the sour-water stripper 660. Water, $NH_3$ and $H_2S$, and any $(NH_4)_2S$ formed by the reaction of $NH_3$ and $H_2S$, are removed in the sour-water stripper 660, and leave the sour-water stripper as a gaseous stream 662. A stream of purified water 661 is thereby produced. This purified water stream 661 is then available as a product stream. If desired, a portion of this purified water stream 661 can be brought back into contact with the gaseous stream 662 of $NH_3$ and $H_2S$ from the sour-water stripper. In this case, the $NH_3$ and $H_2S$ go back into solution in this portion of the liquid water stream 661, forming $(NH_4)_2S$, and this solution is then introduced into the oxidation reactor 640, for conversion to $(NH_4)_2SO_4$. However, preferably the purified water stream is not brought back into contact with the gaseous stream 662 and preferably, stream 662 is cooled as needed so that water in the stream is condensed and the $NH_3$ and $H_2S$ in this stream go back into solution forming $(NH_4)_2S$, and this solution is then introduced into the oxidation reactor 640, for conversion to $(NH_4)_2SO_4$. This approach makes a stream of purified water 661 available, and creates a concentrated treated stream 642 of water, $NH_3$ and $(NH_4)_2SO_4$ at the outlet of the oxidation reactor 540. The stream 652 of recovered $H_2S$ from the $H_2S$ removal unit is also introduced to the oxidation reactor.

This sixth embodiment of the process of the present invention makes a stream of purified water 661 available, and creates a concentrated treated stream 642 of water, $NH_3$ and $(NH_4)_2SO_4$ at the outlet of the oxidation reactor 640. It also provides a secondary stream of cooled vapor product 651 which may contain minute concentrations of $H_2S$, and promotes high overall conversion of $H_2S$ to an $(NH_4)_2SO_4$ product.

The char produced from the hydropyrolysis of biomass (land and water based biomass, wastes from processes utilizing these materials), as well as plastics derived from biomass or petroleum has been found to be an essentially inert carbonaceous material, free of hydrocarbon contaminants that are toxic to humans or plants. It is one intent of this invention to combine the char produced from the hydropyrolysis of biomass or plastic with the ammonium sulfate recovered from this process to produce an agricultural fertilizer product, as a powder, granulated, or pelletized material that can both improve the quality of a soil for use as an agricultural substrate and provide a fertilizing component for the sustenance of lignocellulosic biomass.

EXAMPLES

A sample of wood with properties representative of those of most wood species was subjected to hydropyrolysis. The elemental composition of the wood is presented in Table A, below. The composition is presented on both an overall basis (which includes moisture and ash in the feedstock) and on a moisture- and ash-free (MAF) basis. As can be seen in Table A, small but significant quantities of nitrogen and sulfur were present in the wood.

The yield of hydropyrolysis products, obtained in the vapor stream leaving the experimental hydropyrolizer, is given in Table B. Not all of the nitrogen and sulfur initially present in the wood is ultimately found in the vapor stream from the hydropyrolizer. Some of the sulfur and some of the nitrogen are chemically bound up in the stream of solid product (comprising char and ash) from the hydropyrolizer. However, the experiment demonstrated that the yield of $NH_3$ in the primary product vapor stream constituted 0.18% of the mass of the feedstock, on an MAF basis. The yield of $H_2S$ constituted 0.05% of the mass of the feedstock, on an MAF basis. It will be noted that the total masses in Table B add up to 104.83%. This is due to the fact that a given quantity of moisture and ash-free wood reacts with hydrogen in the hydropyrolysis process, and the resulting products have a greater total mass than the wood that was reacted.

As an example, one might assume that one kilogram of moisture-free, ash-free wood is subjected to hydropyrolysis. In this case, the vapor stream contains 1.8 grams of $NH_3$ and 0.5 grams of $H_2S$. Due to the different molar masses of $NH_3$ and $H_2S$, this equates to 0.106 moles of $NH_3$ and 0.014 moles of $H_2S$. The molar ratio of $NH_3$ to $H_2S$ is therefore 7.4 to 1. In order to form $(NH_4)_2S$ in an aqueous solution, two moles of $NH_3$ are required for each mole of $H_2S$. The relative amounts of $NH_3$ and $H_2S$ in the vapor stream leaving the hydropyrolysis reactor are more than adequate to react all the $H_2S$ in the stream with $NH_3$, and produce an aqueous solution of $(NH_4)_2S$.

Further, the interaction with hydrogen in the hydropyrolysis process converts a significant fraction of the oxygen in the dry, ash-free wood into water vapor in the vapor stream leaving the hydropyrolysis process. Even if the feedstock is completely dry, there is still a significant formation of water during hydropyrolysis of the wood feedstock, and the amount of water produced is sufficient to substantially and completely dissolve all of the $NH_3$ and $H_2S$ present in the hydropyrolysis product vapor stream.

While all or almost all of the $NH_3$ leaving the hydropyrolysis reactor ultimately goes into solution in the primary aqueous stream, the solubility of $H_2S$ in aqueous solutions depends on a variety of factors, such as temperature, pressure, and pH of the solution. The $NH_3$ in solution in the primary aqueous stream will render the solution alkaline, and this will significantly increase the solubility of $H_2S$ in the alkaline aqueous solution. $H_2S$ and $NH_3$ react spontaneously in aqueous solution to form $(NH_4)_2S$, though the sulfide may be present in a dissociated form. However, not all the $H_2S$ in the product vapor stream is likely to enter the primary aqueous stream when the process vapors are cooled. A cooled vapor stream, containing a significant concentration of $H_2S$, is still likely to result in practice. The various embodiments of the process of the present invention, described above, provide means by which this remaining concentration of $H_2S$ can be removed from the cooled vapor stream, and, ultimately, reacted with $NH_3$ and oxygen to form $(NH_4)_2SO_4$.

In actual practice, the biomass feedstock conveyed into the hydropyrolizer will also contain some moisture, so the actual amount of water vapor in the heated vapor stream from the hydropyrolizer will contain significantly more water that would be the case if the feedstock were bone dry.

This phenomenon assists in removal of $H_2S$ from the cooled vapor stream, since the concentrations of $NH_3$ and $H_2S$ in the primary aqueous stream will be even lower than they would be if the feedstock were completely dry, meaning that more $H_2S$ can be stripped from the cooled vapor stream in the condenser and separator of the embodiments of the process of the present invention, described herein above. The solubility of $(NH_4)_2S$ in water is very high, and solutions of $(NH_4)_2S$ containing up to 52% by mass of $(NH_4)_2S$ appear to be commercially available.

TABLE A

Composition of Wood Feedstock

| Wood: | Initial Composition | Initial Composition, MAF Basis |
|---|---|---|
| % C (MF) | 47.6 | 50.2 |
| % H (MF) | 5.7 | 6.0 |
| % O (MF) | 41.2 | 43.5 |
| % N (MF) | 0.2 | 0.2 |
| % S (MF) | 0.1 | 0.1 |
| % ash (MF) | 1.1 | |
| % moisture | 4.3 | |

TABLE B

Yield of hot vapor products from hydropyrolysis of wood, on a moisture- and ash-free (MAF) basis

| Wood Hydropyrolysis Hot Vapor Product Yield (MAF Basis): | Wt % |
|---|---|
| Gasoline | 16 |
| Diesel | 10 |
| Char | 13 |
| Water | 36 |
| CO | 8.4 |
| CO2 | 8.4 |
| C1-C3 | 12.8 |
| H2S | 0.05 |
| NH3 | 0.18 |

Not all biomass is equivalent, and a second feedstock, which differs significantly from wood in terms of mechanical properties, growth cycle, and composition, was also tested. This feedstock was corn stover. Corn stover includes residues of corn stalks and husks, left over after the nutritious parts of the plant have been harvested. The sample examined was typical of most types of corn stover generated during harvesting of corn. The composition of the corn stover sample is presented on both an overall basis (which includes moisture and ash in the feedstock) and on a moisture- and ash-free (MAF) basis in Table C. As can be seen in Table C, small but significant quantities of nitrogen and sulfur were present in the corn stover, as was the case with the wood feedstock. As can be seen from the table, the corn stover sample contained far more ash and far more moisture than did the sample of wood.

As with the wood feedstock, the ratio between hydrogen sulfide and ammonia in the hot product vapor leaving the corn stover hydropyrolysis process is very important. The hydropyrolysis product vapor composition of corn stover was found to be very similar to that of wood, on an MAF basis. The relevant values are shown in Table D. One significant difference between Tables B and D relates to the concentrations of $NH_3$ and $H_2S$ in the product vapor. The molar ratio of $NH_3$ to $H_2S$ in the product vapor, in the case of corn stover, is 15.2. Again, there is more than enough $NH_3$ present to react with the $H_2S$ in the product vapor stream and form ammonium sulfide. As was the case with wood, there is more than sufficient water formed, during hydropyrolysis of corn stover, to completely dissolve any ammonium sulfide, and carry it in solution through the process of the present invention. It will be noted that the total masses in Table D add up to 106%. This is due to the fact that a given quantity of moisture and ash-free corn stover reacts with hydrogen in the hydropyrolysis process, and the resulting products have a greater total mass than the feedstock that was reacted.

TABLE C

Composition of corn typical stover sample

| Corn Stover: | Initial Composition | Initial Composition, MAF Basis |
|---|---|---|
| % C (MF) | 38.0 | 50.7 |
| % H (MF) | 4.8 | 6.4 |
| % O (MF) | 31.2 | 41.6 |
| % N (MF) | 0.9 | 1.2 |
| % S (MF) | 0.1 | 0.2 |
| % ash (MF) | 8.3 | |
| % moisture | 20.0 | |

TABLE D

Composition of effluent vapor, hydropyrolysis of typical corn stover, on MAF basis

| Corn Stover Hydropyrolsyis Hot Vapor Product Yield (MAF Basis): | Wt % |
|---|---|
| Gasoline | 15 |
| Diesel | 9 |
| Char | 15 |
| Water | 36 |
| CO | 8.4 |
| CO2 | 8.4 |
| C1-C3 | 13.8 |
| H2S | 0.12 |
| NH3 | 0.92 |

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

The invention claimed is:

1. A hydropyrolysis process comprising:
    introducing biomass and hydrogen into a hydropyrolyzer comprising one or more reactors;
    sufficiently deoxygenating the biomass to provide a vapor product of the hydropyrolyzer comprising, in the gaseous state, deoxygenated condensable hydrocarbons, non-condensable gases, and water;
    cooling the vapor product to condense a liquid organic phase and a liquid aqueous phase comprising at least one species of the vapor product, including ammonia ($NH_3$), that is solubilized in the liquid aqueous phase; and
    phase separating the liquid aqueous phase from the liquid organic phase and obtaining a gas phase $NH_3$ product or an aqueous ammonia product from the aqueous phase.

2. The process of claim 1, wherein the hydropyrolyzer comprises multiple reactors in series.

3. The process of claim 1, wherein $NH_3$ and $H_2S$ are first and second species of said at least one species of the vapor product, wherein said cooling of the vapor product condenses the liquid aqueous phase comprising an initial $NH_3$ amount and an initial $H_2S$ amount and wherein the solubilized $NH_3$ is present in the liquid aqueous phase as an excess amount that remains after reaction of said initial $NH_3$ amount with said initial $H_2S$ amount to form $(NH_4)_2S$ in the liquid aqueous phase.

4. The process of claim 3, wherein the aqueous ammonia product is obtained following catalytically reacting the aqueous phase with oxygen to substantially oxidize the $(NH_4)_2S$ to $(NH_4)_2SO_4$.

5. The process of claim 1, further comprising separating, from the condensed organic and aqueous phases, a cooled vapor phase comprising the non-condensable gases including non-condensable hydrocarbons and $H_2S$.

6. The process of claim 5, further comprising treating the cooled vapor phase to substantially remove the $H_2S$.

7. The process of claim 6, wherein the treating comprises contacting the cooled vapor phase with a bed of sorbent or with a liquid wash.

8. The process of claim 5, further comprising subjecting at least a portion of the cooled vapor phase to steam reforming, in order to generate hydrogen.

9. The process of claim 1, wherein the method comprises obtaining a gas phase $NH_3$ product by subjecting the liquid aqueous phase, comprising said solubilized $NH_3$, to sour water stripping.

10. The process of claim 9, wherein $NH_3$ and $H_2S$ are first and second species of said at least one species of the vapor product, wherein said cooling of the vapor product condenses the liquid aqueous phase comprising an initial $NH_3$ amount and an initial $H_2S$ amount, and wherein the solubilized $NH_3$ is present in the liquid aqueous phase as an excess amount that remains after reaction of said initial $NH_3$ amount and said initial $H_2S$ amount to form $(NH_4)_2S$ in the liquid aqueous phase, and wherein the gas phase $NH_3$ product is obtained following reacting the liquid aqueous phase with oxygen to substantially oxidize the $(NH_4)_2S$ to $(NH_4)_2SO_4$, followed by subjecting the liquid aqueous phase to the sour water stripping.

11. The process of claim 10, wherein reacting the liquid aqueous phase with oxygen is performed catalytically.

12. The process of claim 1, wherein the aqueous ammonia product is obtained following reacting the liquid aqueous phase with oxygen to substantially oxidize the $(NH_4)_2S$ to $(NH_4)_2SO_4$.

13. The process of claim 1, wherein the biomass contains moisture that contributes to the liquid aqueous phase.

14. The process of claim 1, wherein the deoxygenated condensable hydrocarbons are substantially recovered in the liquid organic phase and comprise hydrocarbons having properties corresponding to gasoline, diesel, and kerosene.

15. The process of claim 1, wherein the biomass contains nitrogen (N) compounds and sulfur (S) compounds that, upon reaction with said hydrogen that is introduced into said hydropyrolyzer, form both $NH_3$ and $H_2S$ that are present in the vapor product, wherein an initial amount of $NH_3$ that is present is in excess of that required to react with an initial amount of $H_2S$ that is present, to form $(NH_4)_2S$.

16. The process of claim 1, wherein said vapor product comprises both $NH_3$ and $H_2S$ as first and second species of said at least one species of the vapor product and the liquid aqueous phase comprises more water than is sufficient to dissolve, into the liquid aqueous phase, $(NH_4)_2S$ that is formed by the reaction of the $NH_3$ with the $H_2S$.

17. A method for preparing an ammonia product, comprising:
processing biomass in a hydropyrolyzer to obtain solid char and a heated vapor product comprising hydrogen, carbon monoxide, carbon dioxide, deoxygenated condensable hydrocarbons, and water vapor;
cooling the heated vapor product to condense, as separate liquid phases, an organic phase and an aqueous phase comprising $NH_4OH$ that is formed from the dissolution of $NH_3$ from the heated vapor product into the aqueous phase; and
separating the liquid phases and obtaining the ammonia product as a gas phase $NH_3$ product or an aqueous $NH_4OH$ product from the aqueous phase.

18. The method of claim 17, wherein the vapor product comprises both $NH_3$ and $H_2S$ and the aqueous phase further comprises $(NH_4)_2S$, that results from the dissolution, into the aqueous phase, of said $NH_3$ and said $H_2S$, upon said cooling of the heated vapor product, followed by reaction of a portion of said $NH_3$ with said $H_2S$ in the aqueous phase.

19. The method of claim 17, wherein the hydropyrolyzer comprises multiple reactors in series.

20. The method of claim 17, wherein the ammonia product is a gas phase $NH_3$ product that is obtained by subjecting the aqueous phase to sour water stripping.

21. The method of claim 17, further comprising:
separating, from the liquid phases, a cooled vapor phase comprising non-condensable hydrocarbons, and
steam reforming at least a portion of the non-condensable hydrocarbons to generate hydrogen that is used for the processing of the biomass in the hydropyrolyzer.

22. A hydropyrolysis process comprising:
introducing a biomass feedstock and hydrogen into a hydropyrolyzer comprising one or more reactors, wherein sulfur is present in the biomass feedstock;
sufficiently deoxygenating the biomass to provide a vapor product of the hydropyrolyzer comprising, in the gaseous state, deoxygenated condensable hydrocarbons, non-condensable hydrocarbons and $H_2S$, and water;
cooling the vapor product to obtain a condensed liquid organic phase, a condensed liquid aqueous phase, and a cooled vapor phase comprising at least a portion of the $H_2S$;
separating the condensed liquid organic phase, the condensed liquid aqueous phase, and the cooled vapor phase;
treating the cooled vapor phase to substantially remove the $H_2S$ and obtain a treated vapor phase comprising at least a portion of the non-condensable hydrocarbons; and
subjecting the treated vapor phase to steam reforming, in order to generate reformer hydrogen from the non-condensable hydrocarbons.

23. The process of claim 22, wherein the hydropyrolyzer comprises multiple reactors in series.

24. The process of claim 22, wherein the step of treating comprises contacting the cooled vapor phase with a bed of sorbent or with a liquid wash.

25. The process of claim 22, further comprising recycling at least a portion of the reformer hydrogen to the hydropyrolyzer.

* * * * *